United States Patent [19]
Llewelyn

[11] 4,018,596
[45] Apr. 19, 1977

[54] HIGH SHRINKAGE POWDER BODY

[75] Inventor: David Myers Llewelyn, Swansea, Wales

[73] Assignee: The International Nickel Company, Inc., New York, N.Y.

[22] Filed: July 16, 1975

[21] Appl. No.: 596,570

Related U.S. Application Data

[62] Division of Ser. No. 467,127, May 6, 1974, Pat. No. 3,918,955.

[30] Foreign Application Priority Data

May 15, 1973  United Kingdom ............. 22961/73

[52] U.S. Cl. .............................................. 75/.5 AA
[51] Int. Cl.² ......................................... B22F 9/00
[58] Field of Search ...................... 75/.5 AA, .5 BA

[56] References Cited

UNITED STATES PATENTS

| | | | |
|---|---|---|---|
| 2,844,456 | 7/1958 | Llewelyn | 75/.5 AA |
| 2,851,348 | 9/1958 | Oestreicher et al. | 75/.5 AA |
| 3,367,767 | 2/1968 | West et al. | 75/.5 AA |
| 3,367,768 | 2/1968 | West et al. | 75/.5 AA |
| 3,702,761 | 11/1972 | Llewelyn | 75/.5 AA |

*Primary Examiner*—W. Stallard
*Attorney, Agent, or Firm*—George N. Ziegler; Ewan C. MacQueen; Raymond J. Kenny

[57] ABSTRACT

Carbonyl nickel powder product relating to B-type carbonyl nickel powder is characterized by very fine particle sizes up to 1.9 Fisher particle size, low percentages of carbon up to 0.03% and high 900° C.-sintering shrinkage of about 25% and has special utility for making sintered filters and magnetically actuated light-reflecting graphic displays.

3 Claims, No Drawings

HIGH SHRINKAGE POWDER BODY

This is a division of application Ser. No. 467,127, filed May 6, 1974 now U.S. Pat. No. 3,918,955.

The present invention relates to carbonyl nickel powder and to production of carbonyl nickel powder by thermal decomposition of nickel carbonyl vapour in the hot free space of a decomposer.

The production of carbonyl nickel powder by thermal decomposition has been carried out on an industrial scale for many years. The form of decomposer commonly used consists of a substantially cylindrical vessel with heated walls mounted with its axis vertical, the carbonyl vapour being introduced at the top and the powder falling into the bottom, where it is collected and discharged. The carbon monoxide formed during the decomposition, together with any other gases introduced with the carbonyl, also leave the decomposer at the bottom. These gases carry with them some very fine powder in suspension which is separated and returned to the bottom of the decomposer.

It is well-established that according to the conditions of temperature, the concentration and feed rate of carbonyl, and the presence or absence of diluent gases, e.g., carbon monoxide, the powder produced may assume one of two forms. These are the so-called "A" carbonyl nickel powder, which consists of discrete particles, and the so-called B powder, which consists of agglomerates of interlocking filaments or chains of interconnected (aggregated) particles. B powder has a low bulk density, generally less than 1.5 g/ml, and a microscopic appearance of small spongy flakes. The size of the aggregates of particles making up the chains can vary widely.

The present invention relates only to processes in which B powder is produced.

The use of low rates of carbonyl input and relatively low decomposition temperatures leads to the formation of A powder while at higher input rates and higher decomposition temperatures B powder is obtained, the bulk density of the B powder decreasing as the input rate or decomposition temperature is increased. The higher the rate of carbonyl input or the decomposition temperature, the higher must be the wall temperature of the decomposer, particularly in the upper portion where most of the decomposition occurs, in order to introduce the requisite quantity of heat for the decomposition. This leads to difficulties when B powder of very low bulk density, e.g., less than 1 g/ml (grams per milliliter) or even less than 0.8 g/ml, is required, since at high wall temperature part of the large amount of carbonyl introduced tends to decompose near or even on the walls, so that a layer of fluffy powder builds up on the walls. This interferes with heat transfer through the walls, and the plant must be periodically shut down in order to remove it. This is an inconvenient, dirty and time-consuming procedure.

In accordance with the present invention, B powder having a given low bulk density is obtained with a lower carbonyl input or decomposition temperature, and thus a lower wall temperature, with a carbonyl decomposition process wherein the fine particles suspended in the exit gases from the decomposer are kept separate from the main product.

This is surprising, since in B nickel powder a low particle size has been associated with a low bulk density. On this basis the fines fraction having a lower Fisher particle size than the main product would be expected to have a lower bulk density, and thus it would be expected that removal of this fines fraction from the system would raise the bulk density of the product. However it is surprisingly found that the fines, although having a lower Fisher value, have higher bulk density than the main product and that their removal from the system correspondingly decreases the bulk density of the remainder of the powder. This in turn means that a main product (less the fines) having the same bulk density as that hitherto obtained with incorporation of the fines can be obtained at a lower carbonyl input rate than hitherto.

In the process of the present invention for the production of B type nickel powder by the thermal decomposition of nickel carbonyl in a decomposer with or without the presence of a diluent gas, the rate of input of nickel carbonyl, the decomposition temperature, and the amount of any diluent gas introduced are correlated to provide that fluffy nickel powder is not deposited on the heated walls of the decomposer, and fine nickel powder suspended in gases leaving the decomposer is recovered separately, e.g., by filter, from the B type nickel powder settling at the bottom of the decomposer.

Operating in this way not only enables B nickel powder to be obtained with a larger particle size for a given bulk density, but also enables powders having unusually low bulk density, i.e., less than 1 g/ml, e.g., 0.8 g/ml, or less than 0.8 g/ml, preferably less than 0.5 g/ml and even as low as 0.3 g/ml or less, to be obtained on a practical industrial scale. It is also found that at any given bulk density the powder produced exhibits substantially less shrinkage on sintering than the powder hitherto produced. Generally speaking, the fine particles recovered from the gases have a Fisher particle size of less than 2 $\mu$m, (microns) e.g., from 1.5 to 1.9 $\mu$m, and amount to from 10% to 17%, e.g., about 15%, by weight of the total amount of powder produced.

The nickel carbonyl vapour fed to the decomposer is advantageously diluted, preferably with carbon monoxide or other inert diluent gas, so that carbonyl concentration is preferably in the range of 10% to 80% by volume of the total gas entering the decomposer. In addition it is advantageous to introduce as a diluent a small amount of an agent for promoting solid nuclei formation for the powder, preferably oxygen, for the purpose of reducing the shrinkage on sintering without substantially changing the bulk density, as described in U.S. Pat. No. 2,844,456. Preferably, oxygen is introduced in an amount of from 0.01% to 0.06% by volume of the total gas entering the decomposer, but larger amounts, up to not more than 0.1%, can be used, though these tend to lower the Fisher value of the powder.

By way of example, B nickel powder was produced by the decomposition of nickel carbonyl vapour mixed with carbon monoxide in a decomposer consisting of an upright cylindrical vessel 2m (meters) in diameter and 10m high, the walls of which were externally heated electrically. The internal temperatures were measured by means of thermocouples mounted on a vertical axis 20.3 cm from the walls at various levels, and the wall temperature was measured at various levels by thermocouples mounted in the walls, three thermocouples being placed at each level 120° apart around the circumference of the wall.

Two series of tests were carried out. In the first series the fine powder separated from the exit gases was returned to the bottom of the decomposer. In the second series, which are examples according to the invention, the fine powder was recovered separately from the powder settling at the bottom of the decomposer. The internal and wall temperatures measured as described above were as set forth in the following Table I, the internal temperatures being the same in the two series of the tests but the wall temperatures in the upper part of the decomposer being lower in the second series.

flushed with nitrogen, and heated for 20 minutes at 900° C. under flowing hydrogen.

Powder produced by the process of the invention is particularly useful for the production of sintered supports for the plates of nickel alkaline batteries. This is due, inter alia, to the fact that separation of the fines according to the invention reduces the linear shrinkage of the powder produced according to the invention, on sintering, resulting in high porosity values and reduced sinterability.

TABLE I

| Depth* (cm) | Temp. point. | Internal temp. (° C.) | Temp. point. | Wall temp. (° C.) Series I | Series II | Depth* (cm) |
|---|---|---|---|---|---|---|
| 132 | $T_1$ | 260–270 | $T_7$ | 480–490 | 430–440 | 107 |
| 183 | $T_2$ | 240–250 | $T_8$ | 480–490 | 460–470 | 320 |
| 343 | $T_3$ | 250–260 | $T_9$ | 450–460 | 450–460 | 533 |
| 488 | $T_4$ | 260–270 | $T_{10}$ | 420–430 | 420–430 | 747 |
| 554 | $T_5$ | 270–280 | | | | |
| 793 | $T_6$ | 260–270 | | | | |

* Below top of decomposer.

The operating conditions in each series of tests are set forth in Table II infra, together with the bulk density and Fisher particle size of the powder produced, which in each case was B powder.

Further, and of surprise, it was found that the fine particles have a remarkably low carbon content, preferably not more than 0.03% by weight and generally

TABLE II

| Total gas flow ($m^3/h$) | Ni(CO)$_4$ concn. (% vol) | Bulk density (g/ml) | Fisher size ($\mu m$) | Total gas flow ($m^3/h$) | Ni(CO)$_4$ concn. (% vol) | Bulk density (g/ml) | Fisher size ($\mu m$) |
|---|---|---|---|---|---|---|---|
| 620 | 14–18 | 0.52 | 2.33 | 550 | 14–18 | 0.53 | 2.87 |
| " | " | 0.64 | 2.44 | 550 | " | 0.62 | 2.88 |
| " | " | 0.76 | 2.35 | 550 | " | 0.73 | 2.91 |
| " | " | 0.87 | 2.65 | 560 | " | 0.90 | 3.07 |

In both series the input gases in each test included 0.06% by volume of oxygen.

In the tests of Series I, nickel powder accumulated on the heated walls of the decomposer as fluffy deposit and this powder appeared in the main product, whereas with the examples of Series II there was no evidence of fluff in the product and, by inference, not on the wall of the decomposer.

Preferably, in the process according to the invention the rate of nickel carbonyl input is in the range of from 70 to 117 $m^3/h$ (cubic meters per hour), that is to say a total gas input in the range of from 500 to 650 $m^3/h$ with the concentration of nickel carbonyl in the range of from 14% to 18% by volume of the total gas entering the decomposer, and the temperature of the inner wall of the decomposer is in the range of from 400° C. to 500° C. and advantageously not greater than 470° C.

The diminished tendency of the powder to shrink on sintering when the fine particles are excluded is shown by the following results, in Table III, of comparative tests for typical batches of nickel powder mode without separation of fines (contra to the invention) and with separation of fines (examples according to the invention).

about 0.02%, compared with 0.12% to 0.2% for the balance of the powder. The fine powder obtained with the invention has a high shrinkage on sintering typically of about 25%, and is particularly useful for making sintered filters. The fine particles can be transformed into flake form by mechanical treatment and in this form can be used as a selective light reflecting means in graphic displays actuated magnetically to provide visible patterns.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. As a new article of manufacture, a body of carbonyl nickel particles characterized by a carbon content up to 0.03%, a Fisher particle size up to about 1.9 microns and a shrinkage on sintering 20 minutes at 900° C typically about 25%.

2. A body of carbonyl nickel particles according to

TABLE III

| Fines not separated | | | Fines separated | | |
|---|---|---|---|---|---|
| Bulk density (g/ml) | Fisher size ($\mu m$) | Linear shrinkage(%) | Bulk density (g/ml) | Fisher size($\mu m$) | Linear shrinkage(%) |
| 0.50 | 2.30 | 10 | 0.5 | 2.60 | 5 |

The linear shrinkage on sintering was measured as the percentage reduction in length of a body of powder loosely filled into a covered graphite-coated mould, claim 1, having a Fisher particle size of about 1.5 microns to 1.9 microns.

3. A body of carbonyl nickel particles according to claim 1 having a carbon content of about 0.02%.

* * * * *

UNITED STATES PATENT OFFICE
CERTIFICATE OF CORRECTION

PATENT NO. : 4,018,596
DATED : April 19, 1977
INVENTOR(S) : DAVID MYERS LLEWELYN It is certified that error appears in the above-identified patent and that said Letters Patent are hereby corrected as shown below:

Column 1, line 51, for "temperature" read --temperatures--.

Column 3, line 24, Table II, insert --Series I-- over the first four columns and insert --Series II-- over the last four columns; same column, Table II, in the "Total gas flow $m^3/h$" columns remove the "3" from the fourth row in each "Total gas flow" column; same column, line 36 after "as" insert --a--; same column; line 54, for "mode" read --made--.

Signed and Sealed this

Sixth Day of September 1977

[SEAL]

Attest:

RUTH C. MASON
Attesting Officer

LUTRELLE F. PARKER
Acting Commissioner of Patents and Trademarks